United States Patent
Toivonen et al.

(10) Patent No.: US 7,257,598 B2
(45) Date of Patent: Aug. 14, 2007

(54) SYSTEM AND METHOD FOR GENERATING DESCRIPTIVE LINK NAMES

(75) Inventors: Hannu T. T. Toivonen, Helsinki (FI); Antti Sorvari, Sipoo (FI); Markus Kähäri, Helsinki (FI)

(73) Assignee: Nokia Corporation, Espoo (FI)

(*) Notice: Subject to any disclaimer, the term of this patent is extended or adjusted under 35 U.S.C. 154(b) by 455 days.

(21) Appl. No.: 10/325,627

(22) Filed: Dec. 19, 2002

(65) Prior Publication Data
US 2004/0122848 A1 Jun. 24, 2004

(51) Int. Cl.
*G06F 17/30* (2006.01)
*G06F 15/16* (2006.01)

(52) U.S. Cl. ............... 707/102; 707/3; 707/5; 707/7; 707/104.1; 709/217; 715/500

(58) Field of Classification Search .............. 707/3, 707/5, 7, 10, 102, 104.1; 709/217; 715/500, 715/501.1, 513, 526, 760, 826
See application file for complete search history.

(56) References Cited

U.S. PATENT DOCUMENTS

| | | | |
|---|---|---|---|
| 6,100,890 A | 8/2000 | Bates et al. | 715/826 |
| 6,212,522 B1 | 4/2001 | Himmel et al. | 707/10 |
| 6,408,316 B1 | 6/2002 | Himmel et al. | 715/501.1 |
| 2001/0044808 A1 | 11/2001 | Milewski et al. | 707/204 |
| 2003/0105647 A1* | 6/2003 | Miyata et al. | 705/1 |
| 2004/0088306 A1* | 5/2004 | Murthy et al. | 707/100 |

FOREIGN PATENT DOCUMENTS

JP 2002-251338 9/2002

OTHER PUBLICATIONS

"m-Links: An Infrastructure for Very Small Internet Devices", ACM SIGMOBILE Jul. 2001, Rome, Italy; ACM ISBN 1-58113-422-Mar. 1, 2007; Jul. 16-21, ACM Press, 2001, pp. 122-131, Jul. 16, 2001; by Bill N. Schilit et al.*

Li et al., "PowerBookmarks: a system for personalizable Web Information organization, sharing, and management", Computer Networks, vol. 31, No. 11-16, May 17, 1999, pp. 1375-1389.

* cited by examiner

*Primary Examiner*—Jeffrey Gaffin
*Assistant Examiner*—Hassan "Tony" Mahmoudi
(74) *Attorney, Agent, or Firm*—Hollingsworth & Funk, LLC

(57) ABSTRACT

A system and method for descriptively naming links to facilitate subsequent identification of the links. Various naming sources are identified as candidates for inclusion in a link name for the link. Naming rules are applied to identify one or more of the naming sources to be included in the link name. The link name is generated based on the naming sources identified by the naming rules.

40 Claims, 8 Drawing Sheets

SYSTEM AND METHOD FOR GENERATING DESCRIPTIVE LINK NAMES

FIELD OF THE INVENTION

This invention relates in general to computer system links, and more particularly to a system and method for automatically naming links in a descriptive manner to facilitate identification of the content associated with the named links.

BACKGROUND OF THE INVENTION

In various computing environments, "links" are used to provide shortcuts to a designated location, whether that location be a stored file, network or Internet address, e-mail address, or the like. For example, in the Internet context, Internet "favorites" or other bookmarks provide shortcuts to corresponding Internet sites. The name assigned to the bookmark is generally the only indication of the contents of the bookmarked page. Thus, descriptive naming is essential for productive use of these and other links.

In other computing environments, proper naming is equally important. For example, search engines provide results to queries entered by a user. The naming of the results of such queries is important to allow the user to select the most appropriate search result(s) for the query. This is particularly important where the user interface is associated with mobile devices, where display areas are more limited than their desktop counterparts.

Another representative computing environment where proper naming is important is in the context of recommendations. A recommendation engine can gather information for a particular user or group of users, such as gathering information related to the most likely selection category for that user(s). Based on the information gathered, the recommendation engine can "recommend" sites or content to which there is a higher likelihood of interest to the user. These recommended sites are identified by links, which must include logical and useful names in order for the recommendation to be of use to the user. Such recommendation engines may be used with mobile devices, which as described above, have limited space in which the recommended link name(s) may be displayed.

Currently, such links are generally named by the title of the page that corresponds to the link. Therefore, if the page accessed by the link has a descriptive page title, acceptable naming of bookmarks may be realized. However, the title may be uninformative and in many cases nonexistent. More particularly, one problem with page titles used as bookmark names is that no page title is defined for the page. In such a case, the page title cannot be used at all. Another problem is that the page title may simply be too generic for practical use, and does not adequately specify the content at the link location. For example, a page title may be used as a title on every page of a multi-page web document, and bookmarks to multiple pages would have the same bookmark name. Another problem with page titles as bookmark or other link names is that the title may be ambiguous across different services. For example, a city name may be the page title for weather forecasts, city guides, cinema guides, etc. for that particular city. Therefore, use of the page title may not always be a good means for naming bookmarks, recommendations, search results, or other links.

In other cases, the Uniform Resource Locator (URL) or other Uniform Resource Identifier may be used as the bookmark name. However, URLs are often not representative of the associated content. In some cases, the URLs may be exceptionally long, cryptic, or simply non-descriptive and of little to no use as a naming mechanism.

Accordingly, there is a need for a system and method for providing descriptive names for such links. The present invention fulfills these and other needs, and offers other advantages over the prior art.

SUMMARY OF THE INVENTION

To overcome limitations in the prior art described above, and to overcome other limitations that will become apparent upon reading and understanding the present specification, the present invention discloses a system and method for creating link names for links, such as bookmarks, favorites, recommendation links, search result links, and the like.

In accordance with one embodiment of the invention, a method is provided for naming links, to facilitate subsequent identification of the links. The method includes designating naming sources as candidates for inclusion in a link name for the link. Naming rules are applied to identify one or more of the naming sources to be included in the link name. The link name is generated based on the naming sources identified by the naming rules.

According to more particular embodiments of such a method, the designated naming sources may include one or more of a host name associated with the destination page, a destination address such as a URL of the destination page, a textual portion of a referring link, a portion of the content associated with the destination page, and a page title of the destination page. In other particular embodiments of such a method, applying naming rules includes determining the state of a predetermined naming source, and identifying the naming sources to be included as part of the link name based on the state of the predetermined naming source. As an example, determining the state of a predetermined naming source may include determining whether a page title of a destination page exists, where identifying the naming sources to be included in the link name includes identifying the naming sources based on the existence of the page title. The naming rules will thus identify particular naming sources to be included in the link name depending on whether the page title exists or not. In other particular embodiments, other states of the predetermined naming source may be determined, such as determining whether the page title (or other predetermined naming source) occurs at multiple pages within the destination site, and/or determining whether the page title (or other predetermined naming source) occurs at other destination sites. The naming rules will identify particular naming sources to be included in the link name depending on the outcome of such determinations. In still other particular embodiments, generating the link name includes visually differentiating between each of the naming sources identified by the naming rules. For example, the different naming sources that make up the link name may be distinguished from one another using symbols, such as quotation marks, parenthesis, spaces, or any other desired markings.

In accordance with another embodiment of the invention, a method is provided for establishing a link name for a link to at least one destination page. The method includes determining a state of link characteristics associated with the link. One or more link name sources are identified, based on the state of the link characteristics. The link name for the link is generated using information associated with the identified link name sources.

According to more particular embodiments of such a method, the link characteristics may include at least one predetermined link name source, where determining the state of the link characteristics includes determining the state of the predetermined link name source.

In accordance with another embodiment of the invention, a system is provided for generating link names. The system includes multiple link name sources serving as candidates for inclusion in the link name. A rule processor executes a set of naming rules, and in response, determines which of the link name sources are to be included in the link name. A link name generator generates the link name in a predetermined format using the link name sources determined by the rule processor.

According to more particular embodiments of such a system, the multiple link name sources may include any one or more of a destination page title, destination page contents, referring link text, a host name, all or a portion of a search query, entity name of a source of search results, text of links used in arriving at a recommendation, one or more selection genres and/or species, etc. In other embodiments, the rule processor and the link name generator include a processor operable via software or firmware on a computing system or mobile device. In other particular embodiments, the system may include a mode selector coupled to the rule processor to designate one of the sets of naming rules in which to execute. The particular naming rules may be selected, for example, via a user interface, or may be statically or dynamically programmed into the device.

In accordance with another embodiment of the invention, a computer-readable medium is provided having stored instructions that are executable by a computing system for naming links to facilitate subsequent identification of the links. The stored instructions perform steps including designating a plurality of naming sources as candidates for inclusion in a link name for the link, applying naming rules to identify one or more of the naming sources for inclusion in the link name, and generating the link name based on the one or more naming sources identified via the naming rules.

In accordance with another embodiment of the invention, a computer data signal embodied in a carrier wave by a computing system is provided, where the computer data signal encodes a computer program for naming links to facilitate subsequent identification of the links. The computer program includes instructions for designating a plurality of naming sources as candidates for inclusion in a link name for the link, applying naming rules to identify one or more of the naming sources for inclusion in the link name, and generating the link name based on the one or more naming sources identified via the naming rules.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration representative embodiments in which the invention may be practiced. It is to be understood that other embodiments may be utilized, as structural and operational changes may be made without departing from the scope of the present invention.

Generally, the present invention provides a manner of automatically naming links, such as bookmarks, favorites, recommendation links, search result links, and the like. In accordance with the invention, one or more relevant characteristics of the link are determined. As an example, such link characteristics may include whether the page(s) to which a link corresponds includes a particular link field, such as a destination page title. Depending on the state of this link characteristic(s), one or more other link name sources may be identified. Again as an example, these other link name sources may include the host name, the domain name or auxiliary portions of a URL, text of the selected link, destination page contents, and the like. A link name may be automatically generated using the identified link name sources, where the resulting link name has been tailored such that it is as descriptive as possible for the particular situation.

Various problems exist with current naming techniques. For example, current solutions may use the page title or the URL to name stored links such as bookmarks or favorites. This may be acceptable where the page title or URL is descriptive, but often it is not. Further, it is often the case where no page title is provided for a page, in which case no page title can be used. Even where a page title is provided, it may be too generic, or may be ambiguous across different services. For example, the page title may be too generic, in that it does not uniquely specify the content within a site; e.g., where the same page title is used as a title for every page. Or, the page title may be ambiguous across different services, where the same page title is used for each of these services. An example of such an ambiguous page title is a city name, that may be the page title for the city weather service, city guides, cinema guides, etc. Therefore, a better manner for providing link names is desirable, in order to provide the most logical, helpful link names possible.

Figure 1:
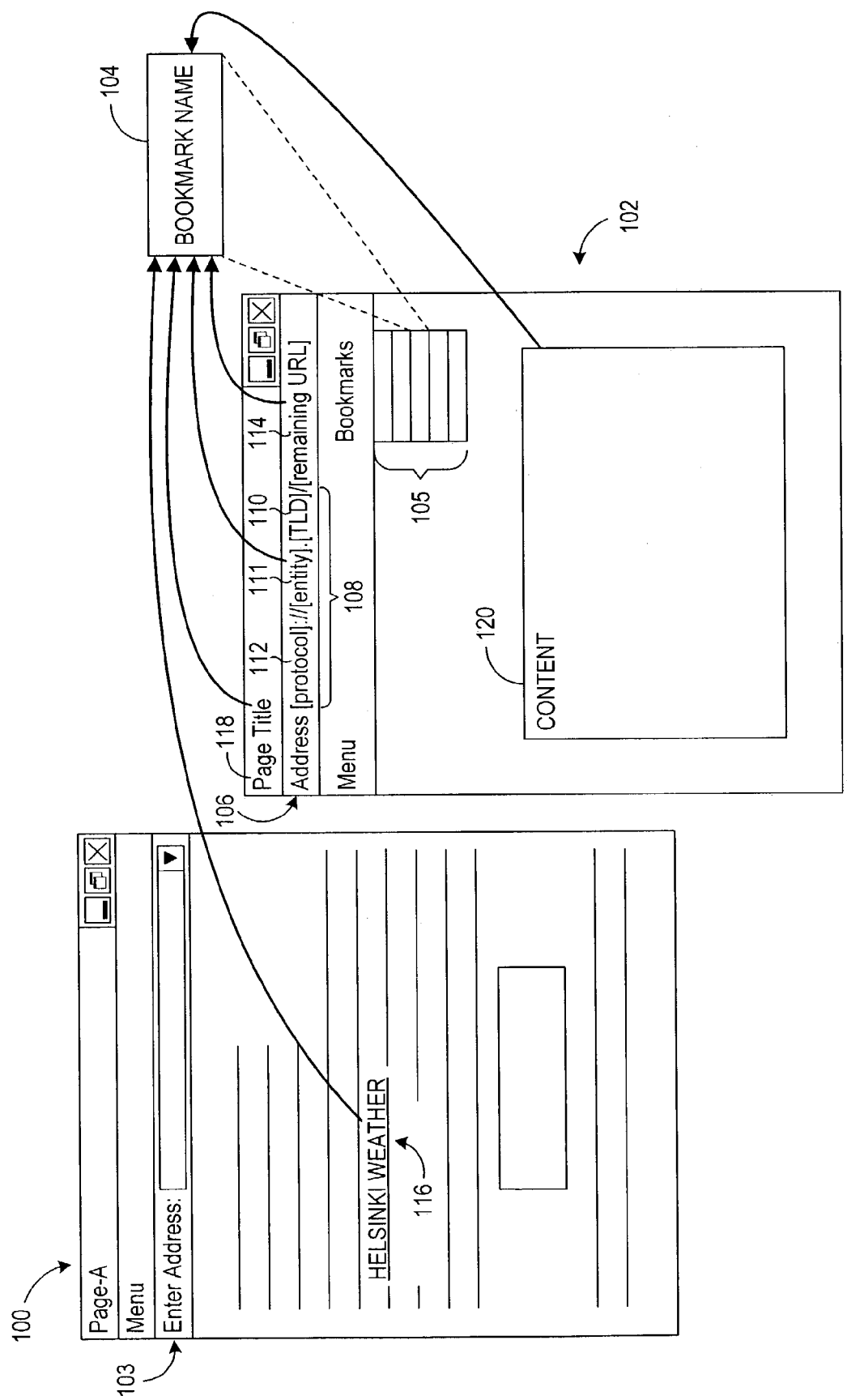
FIG. 1 is a diagram illustrating various representative sources of information utilized in accordance with the present invention to create link names.

FIG. 1 is a diagram illustrating various representative sources of information utilized in accordance with the present invention to provide a robust naming system. Other sources may also be used in connection with the present invention, and the examples identified in FIG. 1 are provided for purposes of illustration. One or more of the available sources of information may be selected for use in generating the link name, and the selection of the appropriate source(s) is accomplished by applying a set of rules as described more fully below.

FIG. 1 illustrates an example where "bookmarks" (also commonly referred to as "favorites") are used to store links in which the user may subsequently choose to select. However, the principles described in connection with FIG. 1 are equally applicable to the generation of link names in the context of, for example, recommendations provided by a recommendation engine, search results provided by a search engine, etc. As shown in FIG. 1, a first page shown as Page-A 100 may be available to a user. For example, the user may have browsed to Page-A 100 via a desktop computer, workstation, mobile device (e.g., wireless telephone, Personal Digital Assistant, laptop computer, etc.), or other communication device capable of viewing addressable content. This page 100 may be considered a referring page, as it is the means by which a user can select or otherwise enter information to be directed to one or more destination pages 102.

It is noted that a "page" as used herein refers to any presentation of the content addressable by the link. For example, selection of an Internet hyperlink, recommendation link, search result link, or the like may present one or more screens to a user upon selection of the hyperlink. The result of selection of a link may also be something other than (or in addition to) a visual screen, such as, for example, an audio file, an executable program, etc. The resulting information (e.g., web pages, documents, audio files, executable programs, etc.) that is presented upon selection of a link is generally referred to herein as a "page(s)." Therefore, one or more "pages" of information resulting from selection of a link is used broadly herein to include any result of the redirection caused by selection of the link.

Various sources of information from the referring page 100 may be used in connection with the present invention to directly or indirectly form part or all of a resulting bookmark name 104 which may be associated with a list 105 of bookmarks. For example, a URL for a destination page 102 may be entered in the address entry field 103 of the referring page 100. The resulting address 106 of the destination page 102 may then be used as a naming source, as described more fully below.

Another source of information from the referring page 100 that may be used to define or partially define bookmark names 104 in accordance with the present invention is the text of the link that brought the user to the destination page 102. More particularly, the referring page 100 may include one or more links, such as Internet links, recommendation links, search result links, and the like. The referring page 100 illustrates one such link 116, labeled "Helsinki Weather" in the illustrated embodiment. In accordance with the present invention, the text associated with such a link 116 may be used in the creation of a saved link name such as a bookmark name 104. Such text links are often descriptive, and thus often address the problem where the destination page title 118 is too generic. The text of the link may not always be descriptive, however, as some links may include generic text such as "click here," "back," "up," etc. In other cases, the text of the link may be too descriptive, such as "Headlines for Nov. 23, 2002" for a page that always contains the "latest" headlines. Further, the link text may not always be available, such as when the user typed the URL into the address field. Despite the possible drawbacks, the text of the link often includes valuable, descriptive text that may be used exclusively or in combination with other source information to create a descriptive link name in which the user can subsequently select. Other sources of information on the referring page 100 other than those described above may also be used in connection with the present invention.

A number of link naming sources according to the present invention may be derived from the destination page 102. A user may be directed to the destination page 102 by way of selection of a link, entry of an address (e.g., URL) in an address entry field 103 of the referring page 100, or otherwise browsing to the destination page 102. A first example of a naming source derived from the destination page 102 is the destination page address 106 itself. Various portions of the URL 106 may be used as sources of information in generating the resulting bookmark name 104. The URL 106 may be any type of Uniform Resource Identifier (URI), and in the illustrated embodiment is depicted as a URL typically used to address servers or other providers via the Internet. The representative URL includes a host name 108, which includes a suffix often referred to as the Top-Level Domain (TLD) 110, an organization/entity identifier(s) 111, and a protocol name 112. The URL may also include a remaining or auxiliary portion 114. As is known in the art, a number of predefined TLDs exist, such as COM, EDU, GOV, MIL, NET, ORG, as well as unique two-letter combinations for every country. Within every TLD is a list of second-level domains, or in some cases third-level, fourth-level, etc. The entity identifier 111, together with the TLD 110, is often referred to as the second-level domain (SLD) which specifies the name of a specific machine (with a specific IP address) in a domain. As will be described in further detail, any of these portions of the URL may be used to create all or part of a bookmark name 104.

More particularly, the host name 108 helps to identify the service/site. For purposes of this description, it will be assumed that the host name 108 includes the TLD 110 and protocol 112, unless otherwise noted or obvious from the context of its use. Use of the host name 108 in the bookmark name 104 helps solve the problem of ambiguous page titles across different services. For example, if the page title is "Helsinki" for multiple services, the host name 108 can be included in the resulting bookmark name 104 to provide additional information that helps identify what the bookmark corresponds to. The host name 108 is generally the same across a host and thus may not help differentiate pages "within" a service, but will help differentiate "across" different services. In one embodiment, standard prefixes including the protocol 112 may be stripped off prior to naming the link. Such standard prefixes include, for example, "http://," "http://www.," "http://wap.," etc.

The remaining portion 114 of the URL 106 may also be used as a source of information for naming links in accordance with the present invention. The remaining portion 114 generally corresponds to the resource description portion associated with the host name 108, and may include various types of information, such as path and file information, and various arguments. In one embodiment of the invention, this remaining portion 114 or "URL tail" may be used as at least part of the resulting bookmark name 104.

The destination page 102 includes other sources of information for creating link names. For example, the page title 118 may be used, as previously described. Another source of information on the destination page 102 is the content 120 itself, or at least a portion of the content 120. For example, in one embodiment of the invention, the first predetermined number of words of displayed content (excluding links) may be used as a part or all of the bookmark name 104 or other link name. The first words of the content are meant to be understandable, in that it generally does not include unintelligible information such as that which can be associated with portions of a URL. For example, the first line of content in Wireless Application Protocol (WAP) content is often used to replace the page title. Further, on the World Wide Web (WWW), the first line is often a headline. More particularly, documents available on the WWW and written in HTML often include a heading, delineated by <Hx> tags, where "x" represents the heading number. This can be very valuable in creating a link name. On the other hand, the first predetermined number of words of the content 120 may not be descriptive of the "entire" contents of the page. Further, content 120 may change, but bookmark and other link names generally remain static. In practice, portions of the content 120 are more often informative than not.

Figure 2:
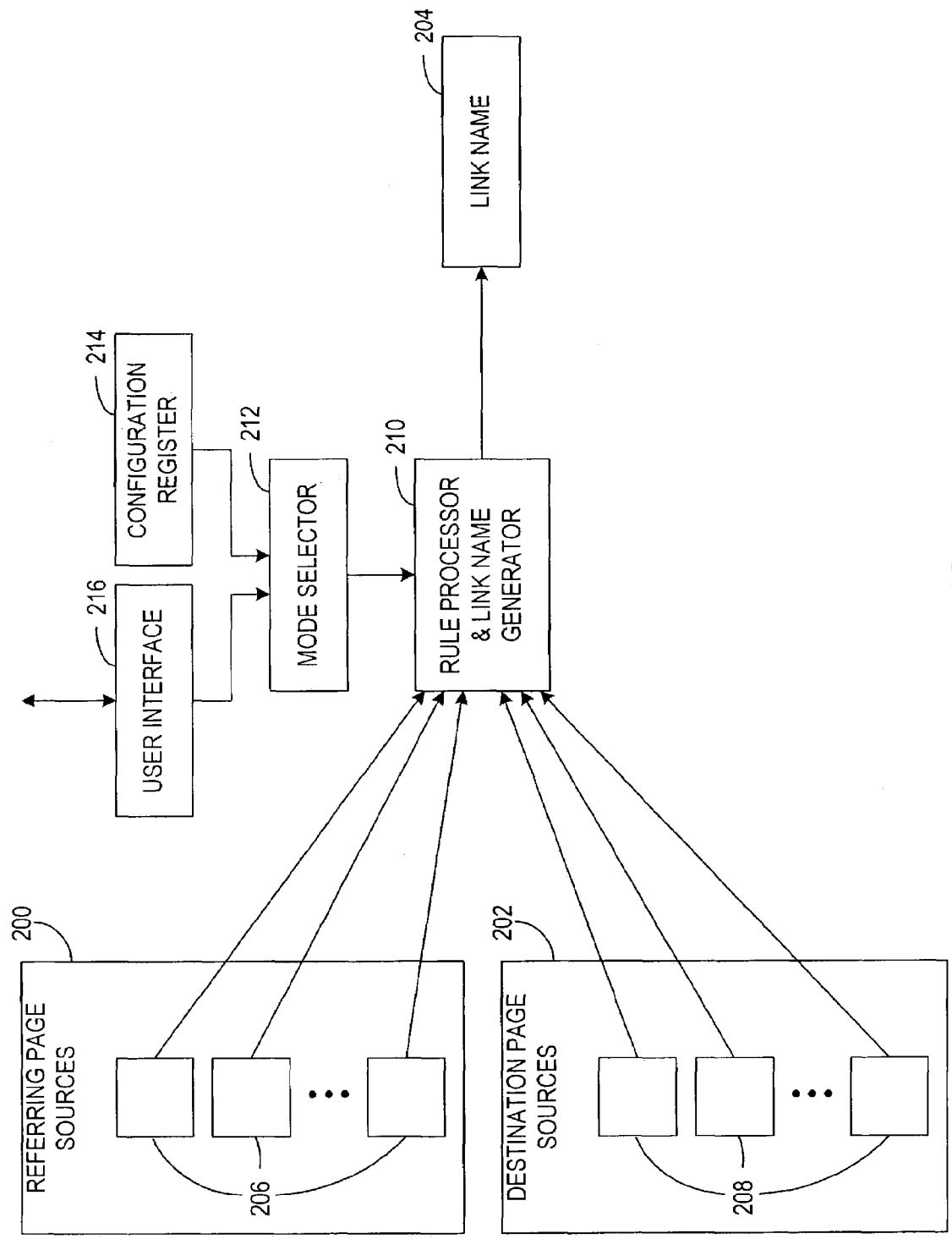
FIG. 2 is a block diagram illustrating a link naming system utilizing naming rules in accordance with one embodiment of the present invention.

Because there are pros and cons associated with the various sources of information, naming rules are established in accordance with the present invention. These rules define the conditions in which one or more of the various sources of information will be used in the creation of the link name. FIG. 2 is a block diagram illustrating a link naming system utilizing such rules in accordance with one embodiment of the present invention. As described in connection with FIG. 1, sources of information can come from a variety of places, including the referring page and/or the destination page. FIG. 2 illustrates that referring page sources 200 and/or destination page sources 202 may be used as sources of information for the ultimate link name 204. The referring page sources 200 may include, for example, entered URLs or subsets thereof that ultimately provide a destination address/URL, text of the referring link, etc. These various referring page sources are generally depicted as sources 206. Similarly, the destination page sources 202 may include, for example, the page title or other header information, the destination URL or subsets thereof, all or a portion of the content, etc. These various destination page sources are generally depicted as sources 208.

Based on rules that can be determined in advance or dynamically modified, the rule processor and link name generator 210 can determine which one or more of the sources 206, 208 will be used to ultimately create the link name 204. The rule processor and link name generator 210 may be implemented using, for example, a processing device(s) such as a microprocessor, microcontroller, or other processing device operable via software or firmware. Hardware implementations may also be utilized. In one embodiment of the invention, the rule processor and link name generator 210 may be set to operate under one of a plurality of modes via a mode selector 212. For example, a first set of rules may be designated where various comparisons, filters, and otherwise more "intelligent" decisions are made to arrive at the link name 204 that is most likely to be the most relevant and focused link name. A second set of rules may be designated where fewer decisions are required, and the user is willing to accept longer link names 204 due to a lesser amount of processing being performed. Additional sets of rules may be designated as well. The mode selector 212 can allow selection of the desired set of rules to be applied.

Further, various manners in which modes are selected may be implemented. For example, the mode may be pre-configured, such as programmed into a configuration register 214 or other storage location, program instruction, etc. Alternatively, a user interface 216 may be provided to allow the user to select (and optionally define) an appropriate set of rules. For example, a user of a mobile device may select a first mode corresponding to a first set of rules via a keyboard and display user interface on the mobile device. Once selected, the rule processor and link name generator 210 will process the information sources 206, 208 according to the selected mode.

The present invention may also be used to rename links. In one embodiment, the various naming sources used to originally name a link are stored with the link. In this manner, the user may choose to rename the link via the user interface 216 using one or more of the stored naming sources and/or custom text provided by the user. Alternatively, the naming source data may be available if the user is, for example, renaming a bookmark/favorite to the current page, i.e., the page that is currently open in the user's browser. In one embodiment, the user may be presented with several alternative name options based on different naming rules and naming sources, from which the user may select the desired link name. The user can choose a suggested name, modify a suggested name, or rewrite the link name entirely.

In one embodiment of the invention, naming rules are applied depending on the state of one or more characteristics of the link. For example, a link characteristic may include any one or more of the various information sources for naming the link. As a more particular example, a link characteristic may be the page title of the page to which the link is directed. The "state" of such a link characteristic may include, for example, whether a page title exists, whether the page title is too generic in that it occurs at multiple places within a site, whether the page title is ambiguous in that it occurs at other sites (i.e., occurs across sites), etc. Other examples of a link characteristic may include, for example, a URL, and the state of the URL may include the length of the URL, the content of the URL, etc. Thus, naming rules may be based on any desired characteristics associated with the link.

Figure 3:
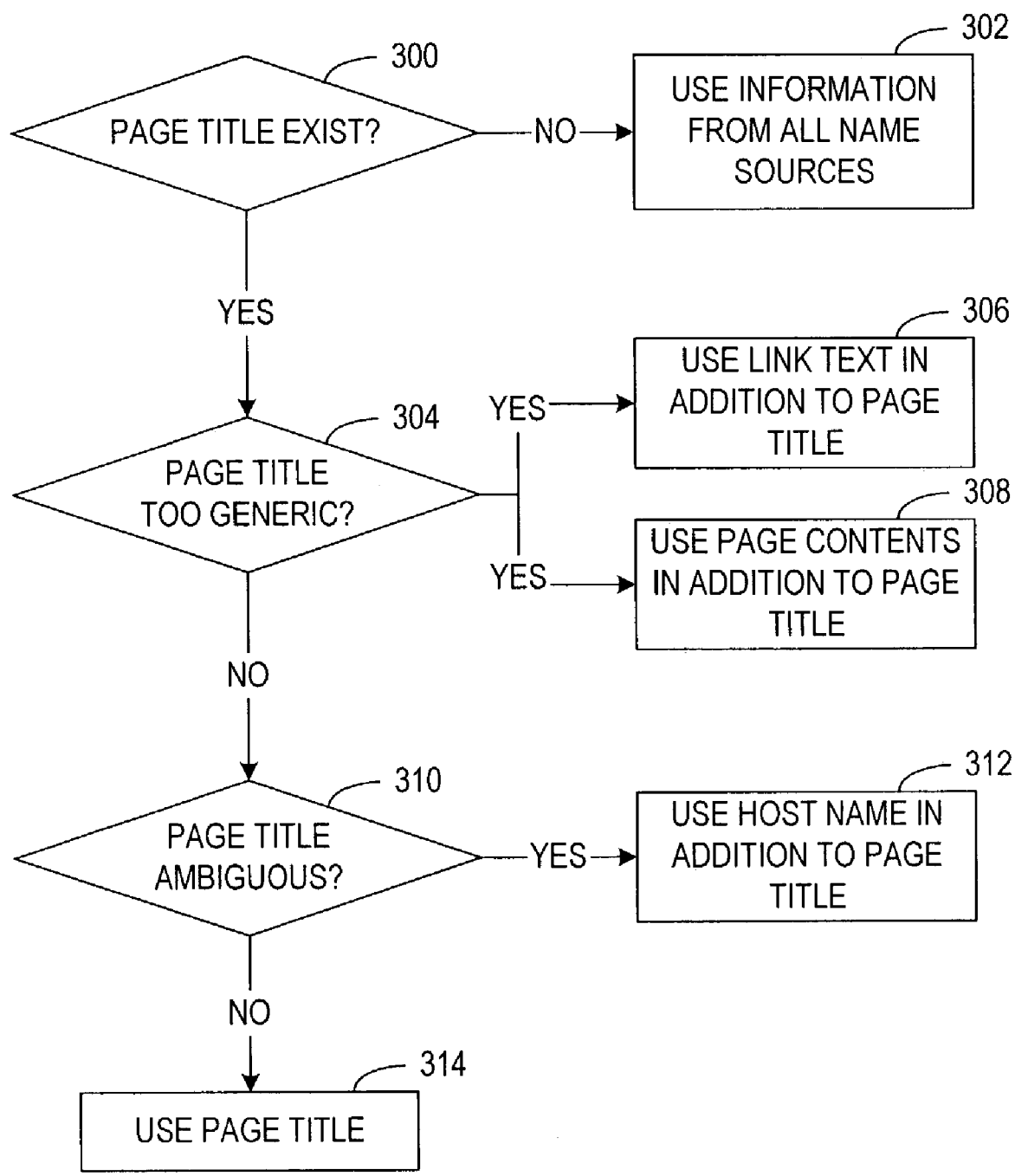
FIG. 3 is a flow diagram illustrating one embodiment of the invention where the destination page title is a link characteristic in which naming rules may be based.

FIG. 3 is a flow diagram illustrating one embodiment of the invention where the destination page title is a link characteristic in which naming rules may be based. In this embodiment, a first state of the page title may be whether a destination page title exists for the particular link, as shown at decision block 300. If the page title does not exist, the naming rules (for this particular naming mode) indicate that information from all name sources may be used in generating the link name as illustrated at block 302. For example, where the page title does not exist, this rule suggests that the host name, content of the destination page, and the link text are used in creating the link name, depending on which of those sources are available. An example of a resulting link name format where all of these information sources are available is shown in Example 1 below:

<content> "<link text>" (<host name>)

EXAMPLE 1

An example of a resulting link name using this format is shown in Example 2 below:

XYZ Mail "Check email" (xyzmailservice.com)

EXAMPLE 2

If certain source information was not available, such as content information, the resulting link name would be as shown in Example 3 below:

"Check email" (xyzmailservice.com)

EXAMPLE 3

If the page title exists as determined at decision block 300, then the naming rules may take different actions. For example, if the page title exists, it may be assumed that the page title will provide some relevant naming information, and thus all of the other information sources are not necessary. This will depend on the particular rules established for such a case. In one embodiment, if the destination page title exists, it is determined 304 whether the page title is too generic. As previously described, this may occur where the page title occurs elsewhere within the site. This can be determined, for example, by comparing page titles within the site, and if multiple page titles match within that site, then the page title may be deemed too generic. In another embodiment, the computer, mobile terminal, or other user terminal/device can store page titles and link names locally (e.g., as bookmarks, history lists, recommendations, etc.). The user device can then compare a page title or potential link name to those stored to determine whether the page title or potential link name is too generic. If the page title is determined 304 to be too generic, the naming rules in one embodiment of the invention suggest that other information sources are also used to name the link. For example, the link text may be used in addition to the page title as shown at block 306. An example of a resulting link name format where the link text is used in addition to the page title is shown in Example 4 below:

"<link text>"

EXAMPLE 4

An example of a resulting link name using this format is shown in Example 5:

XYZ Top Stories "Health News"

EXAMPLE 5

In another embodiment using link text as a naming source, link text from one or more links previous to the current link may also be used as a naming source. For example, a chain of links could be, for example, 1) Weather; 2) Helsinki; 3) Tomorrow. In this example, the text associated with one, two, or all three of the links may be used in formulating the link name. Thus, as used herein, link text as a naming source may include the most direct link to the destination page, or any number of previous links in the chain.

The naming rules may provide alternatives as well. If link text is not available, the page contents (e.g., a first predetermined number of words of the page contents) may be used in addition to the page title as shown at block 308. An example of a resulting link name format where the page contents are used in addition to the page title is shown in Example 6:

:<content>

EXAMPLE 6

An example of a resulting link name using this format is shown in Example 7 below:

XYZ Top Stories: Today's Health News

EXAMPLE 7

In one embodiment, if the destination page title exists, it is determined 310 whether the page title is ambiguous. As previously described, this may occur where the page title occurs at other sites. This can be determined, for example, by comparing page titles across sites, and if multiple page titles match across sites, then the page title may be deemed ambiguous. In another embodiment, the computer, mobile terminal, or other user terminal/device can store page titles and link names locally (e.g., as bookmarks, history lists, recommendations, etc.). The user device can then compare a page title or potential link name to those stored to determine whether the page title or potential link name is ambiguous. If the page title is determined 310 to be ambiguous, the naming rules in one embodiment of the invention suggest that other information sources may be used in addition to the page title to name the link. For example, the host name may be appended to the page title as shown at block 312. An example of a resulting link name format where the host name is used in addition to the page title is shown in Example 8 below:

(<host name>)

EXAMPLE 8

An example of a resulting link name using this format is shown in Example 9:

Helsinki (abcweather.fi)

EXAMPLE 9

In one embodiment, the naming rules may use the page title exclusively as shown at block 314 if the page title exists, is not too generic, and is not ambiguous.

Figure 4:
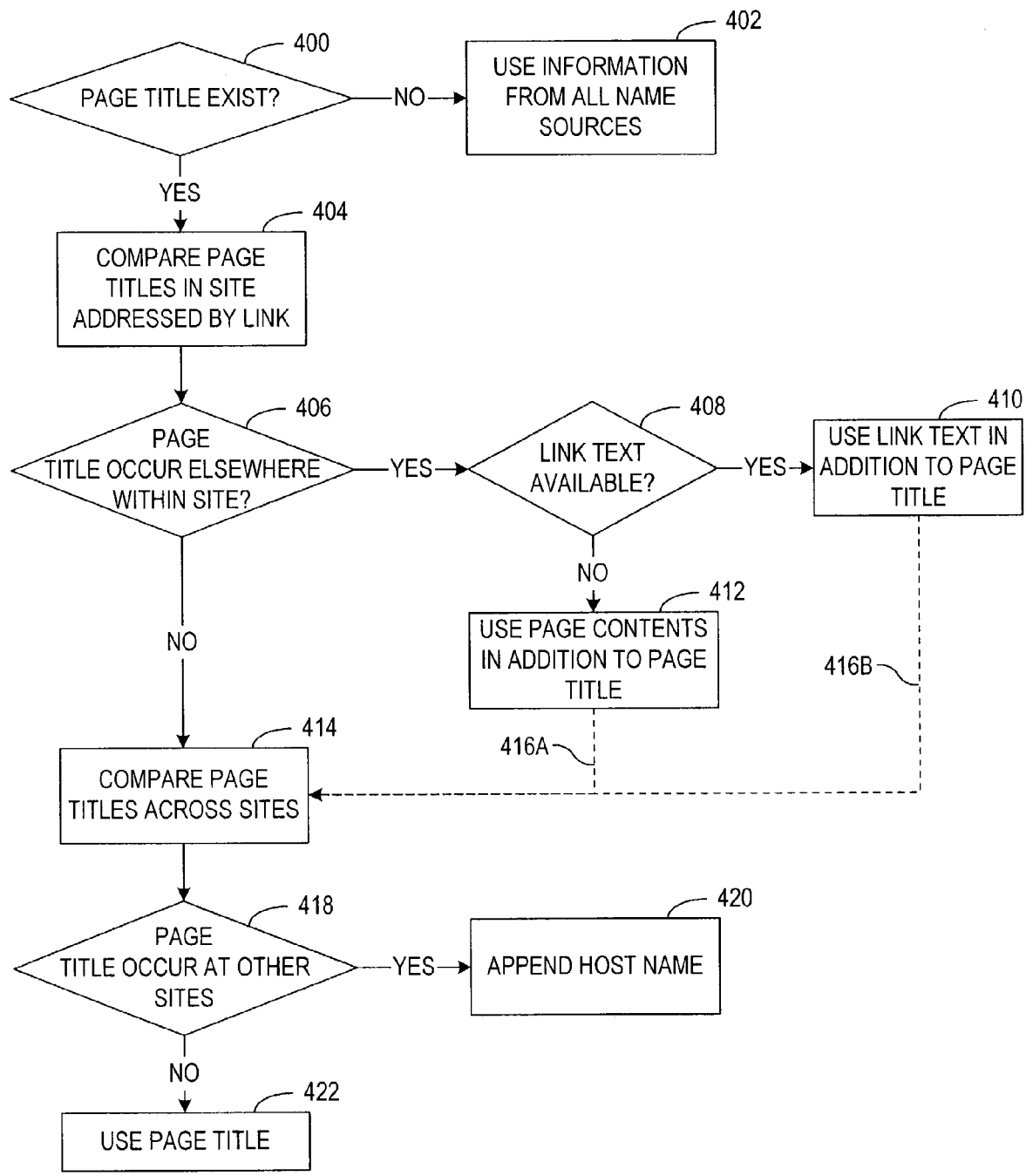
FIG. 4 is a flow diagram illustrating a more detailed embodiment where the destination page title is a link characteristic in which naming rules may be based.

FIG. 4 is a flow diagram illustrating a more detailed embodiment where the destination page title is a link characteristic in which naming rules may be based. In this embodiment, naming rules similar to those described in connection with FIG. 3 are employed. It is determined 400 whether a page title exists, and if not, all name sources (depending on their availability) may be used to generate the link name as shown at block 402. If a page title does exist, page titles in the page addressed by the link are compared 404. If the page title occurs elsewhere within the site as determined at decision block 406, it is determined 408 whether link text is available. If so, the link text is used 410 in addition to the page title. If link text is not available, the page contents are used 412 in addition to the page title.

Page titles across sites may also be compared 414 to determine if the page title is ambiguous. This may occur where it has been determined 406 that the page title is not too generic as a result of the page title occurring elsewhere within the site. Alternatively, this comparison 414 may be effected even where the link name has already been modified due to the page title being too generic, as depicted by dashed lines 416A, 416B. The particular naming rules employed will determine whether the comparison 414 will be effected in addition to using the link text 410 or the page contents 412. As a result of the comparison 414, it is determined 418 whether the page title occurs at other sites. If so, the host name is appended 420. If not, the page title may be used 422 to name the link, or alternatively, the page title plus either the link text or page contents may be used to name the link in the case where it was determined 406 that the page title occurred elsewhere within the site.

Figure 5:
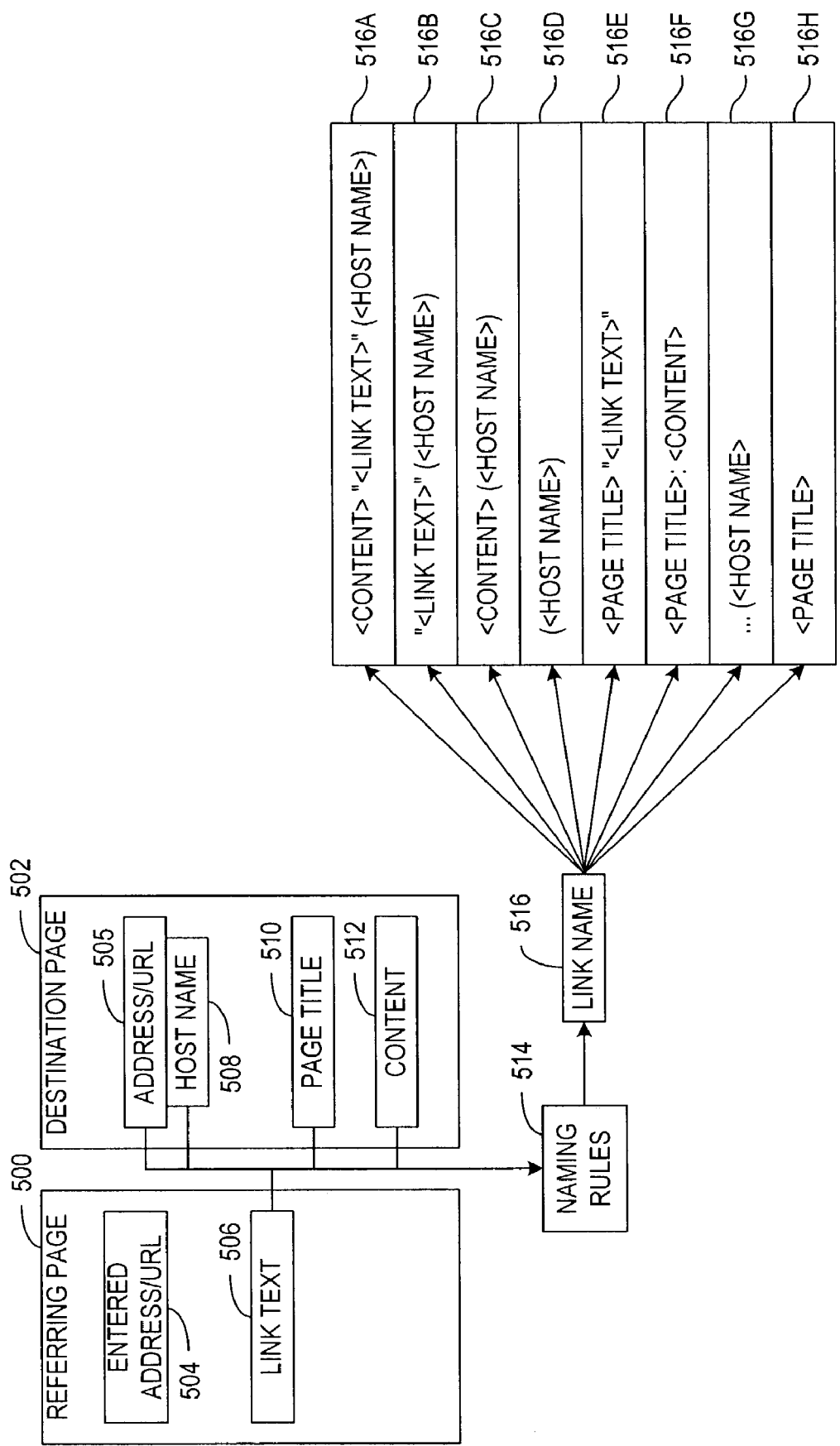
FIG. 5 is a block diagram illustrating naming conventions applied pursuant to naming rules in accordance with one embodiment of the invention.

FIG. 5 is a block diagram illustrating naming conventions applied pursuant to naming rules in accordance with one embodiment of the invention. In the illustrated embodiment, a destination page 502 may be reached from a referring page 500 in a number of manners, including entering the address/URL 504 or selecting the link 506 from the referring page 500. The destination page 502 may include the address URL 505 (which may include the host name 508), a page title 510, page contents 512, or other information serving as a source for ultimately naming the link. Information from any desired sources may be subjected to naming rules 514. Naming rules 514 may be applied by, for example, a processor. Using the particular naming rules 514, the link name 516 can be created. In the illustrated embodiment, different link names will result depending on the naming rules 514 applied, and the availability of the information sources 505, 506, 508, 510, 512.

For example, if no page title 510 exists, the naming rules 514 may create the link name 516 by using the content 512, link text 506, and host name 508, as shown in link name 516A. If no page title 510 nor page contents 512 are available, the link name 516B may be created using the link text 506 and host name 508. If no page title 510 nor link text 506 are available, the link name 516C may be created using the page contents 512 and the host name 508. If none of the page title 510, link text 506, or page contents 512 are available, the link name 516D may be created using the host name 508. If a page title 510 exists and link text 506 is available, the link name 516E may be created using the page title 510 and link text 506. The naming rules 514 may use the page title 510 and link text 506 in this manner when, for example, the page title occurs elsewhere within the site. Alternatively, if a page title 510 exists and link text 506 is not available but page contents 512 are available, the link name 516F may be created using the page title 510 and the page contents 512. The naming rules 514 may use the page title 510 and contents 512 in which manner when, for example, the page title occurs elsewhere within the site, and the link text 506 is not available. If the page title occurs at other sites, then the host name 508 may be appended to the link name as depicted by link name 516G. Alternatively, the page title 510 may be used exclusively as link name 516H demonstrates. The naming rules 514 may indicate that the page title 510 is used exclusively in creating the link name 516H regardless of which information sources are available, or alternatively may indicate that the page title 510 is used in creating the link name 516H when one or more, or all, of the particular information sources are not available.

The above examples are merely representative of the link names that may be created pursuant to one embodiment of the invention where the naming rules 514 are configured to provide such link name results. Other link names may result, depending on the name sources utilized, and the particular naming rules 514 implemented.

Figure 6:
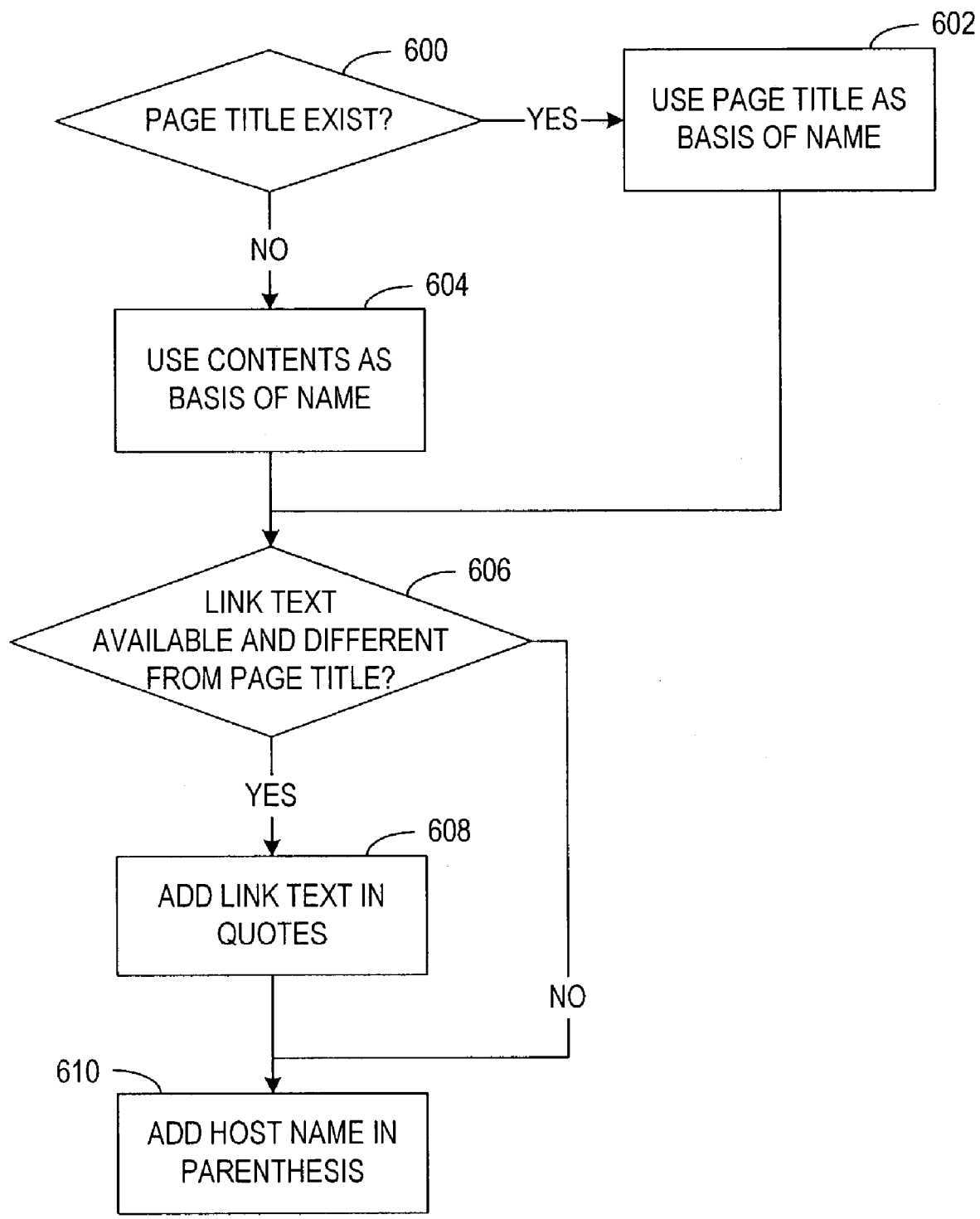
FIG. 6 is a flow diagram of a simplified link naming methodology in accordance with one embodiment of the invention.

As previously indicated, the manner in which bookmarks, favorites, recommendation links, search result links, or other links are named depends on the particular naming rules applied. The naming rules may be static, or may be changed to allow different naming rules to apply at different times. For example, as described in connection with FIG. 2, different modes may be designated that identify different naming rules. The embodiments described in connection with FIGS. 3-5 included decision-making rules, where the ultimate link name may be dependent upon the results of such decisions. For example, the embodiment of FIG. 4 included comparisons 404, 414 and respective decisions 406, 418 to determine how to generate the link name. Other naming rule sets or "modes" may also be implemented in connection with the present invention. FIG. 6 is a flow diagram of a link naming methodology in accordance with one embodiment of the invention, where the methodology does not involve recognition of certain problems such as a page title being too generic or ambiguous. This may result in more simple rule processing, but may in some cases result in more lengthy link names, redundant information in the link name, etc. However, such an embodiment may be particularly useful in applications where limited processing capabilities are available, such as in the context of mobile devices that have reduced processing capabilities versus desktop computers or other systems having more robust processing capabilities.

In the embodiment of FIG. 6, the page title is again viewed as a link characteristic providing some basis for decision making. If the page title exists as determined at decision block 600, the page title is used as the basis of the link name as shown at block 602. Otherwise, the page contents are used 604 as the basis of the link name. If link text is available and different from the page title as determined at decision block 606, the link text and host name may be added as shown at blocks 608 and 610. If the link text is not available as determined at decision block 606, then the host name may be added 610 to the basis of the link name. In one embodiment of the invention, the link text is added 608 using quotation marks, and the host name is added 610 using parenthesis. However, any desired symbols may be used to distinguish the various sources of information. Alternatively, the various portions of the resulting link name may be separated by spaces, or any desired characters.

Examples of resulting link names using a rule set such as that set forth in FIG. 6 are shown below. For example, if a page title exists, and link text is available and different from the page title, a resulting link name format is shown in Example 10:

<page title> "<link text>" (<host name>)

EXAMPLE 10

An example of a resulting link name using this format is shown in Example 11:
Helsinki "Forecast" (abcweather.fi)

EXAMPLE 11

As another example, if the page title does not exist, and link text is not available, a resulting link name format is shown in Example 12:

<content> (<host name>)

EXAMPLE 12

An example of a resulting link name using this format is shown in Example 13:
XYZ Mail (xyzmailservice.com)

Any number of variations may be used in connection with the naming rules. For example, in one embodiment, the host name may always be appended to the link name. In another embodiment, if two or more link names prove to be identical even after processing in accordance with the naming rules, a number or other identifier can be added to the bookmark name. For example, a "−1," "−2," etc. could be added, or "A," "B," etc.

Figure 7:
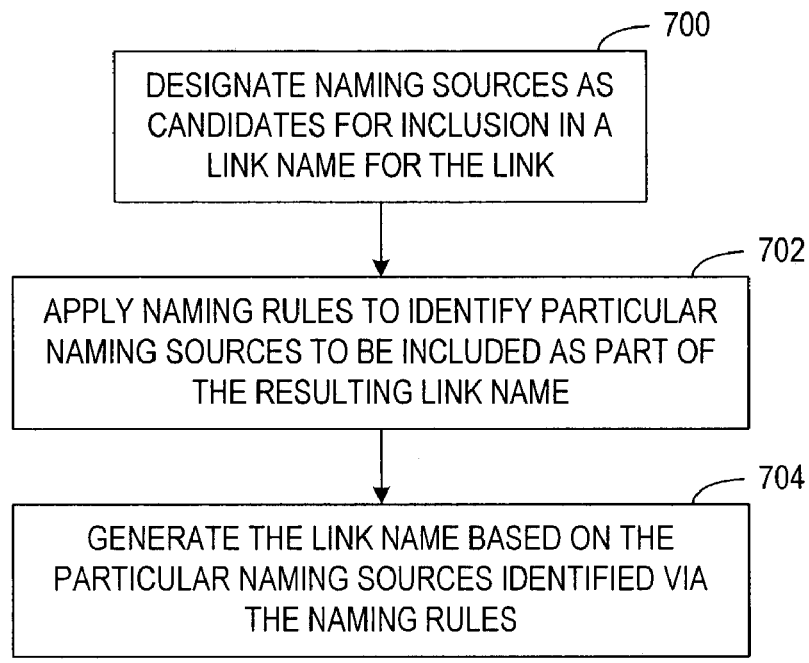
FIGS. 7 and 8 illustrate more general embodiments of methods for naming links in accordance with the present invention.
Figure 8:
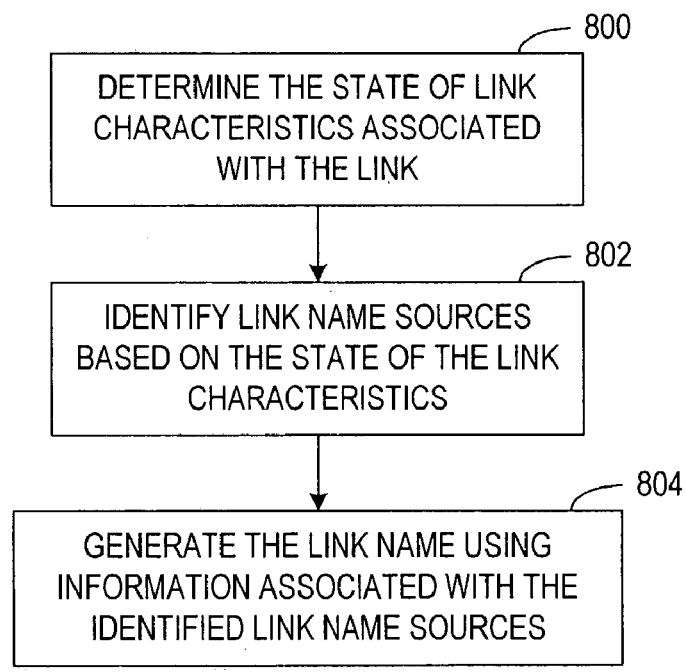

The foregoing description provides various illustrative examples of systems and methods for naming links in accordance with the invention. The present invention is not limited to the representative embodiments set forth above. FIGS. 7 and 8 illustrate more general embodiments of methods for naming links (e.g., bookmarks, favorites, recommendation links, search result links, etc.) in accordance with the present invention. Referring to FIG. 7, naming sources are designated 700 as candidates for inclusion in the link name for the link. Such naming sources may include, for example, the page title, page contents, text of the referring link, the URL or a portion thereof such as the host name, etc. By being designated as candidates for inclusion in the link name, any one or more of these source names may ultimately be used in the generation of the link name. Naming rules are applied 702 to identify particular naming sources that will be included as part of the resulting link name. The link name is then generated 704 based on the particular naming sources identified via the naming rules.

In accordance with another embodiment illustrated in FIG. 8, the state of certain link characteristics associated with the link are determined, as shown at block 800. For example, these link characteristics may include one or more particular naming sources, such as the page title. The "state" of the link characteristics generally refers to a predetermined state, such as whether the particular link characteristic exists or is otherwise available for the link. Other states of the link characteristic may include how the link characteristic is used, such as whether a particular naming source such as a page title is used multiple times within a site or is commonly used across sites. Any other "state" may also be considered, such as a length or readability of a naming source, etc. Link name sources are identified 802 based on the state of the link characteristics. For example, if the state of a link characteristic corresponds to whether or not a page title exists, then particular name sources may be identified based on whether or not the page title exists. The link name is generated 804 using information associated with the identified link name sources. For example, if the identified link sources include a host name, then the link name is generated using information associated with that host name (e.g., abcweather.com).

The embodiments described above are generally described in terms of naming bookmarks, favorites, or other links, for purposes of facilitating an understanding of the invention. However, the present invention is equally applicable to network services and applications such as, for example, naming search results, recommendation links, and the like. Search engine services are commonly available to users via landline and mobile networks. Generally, these search engines accept user input such as text entry, graphical selection such as radio buttons, voice entry, etc. In response, the user receives a list of one or more search results responsive to the query, generally in the form of selectable links. With these selectable search results, the user is hoping to obtain information corresponding to the entered query. Currently, the page title is often used as the name of the resulting search links. However, if the resulting link names (e.g., page titles) of the search results are not adequately descriptive, the user may have to randomly and/or incessantly select links to view the corresponding information. Further, if the description is poor, the user may simply disregard that link(s), even though the content associated therewith is otherwise quite relevant. Therefore, proper naming of search results is particularly important, as poor link naming can significantly impair the value of the search.

The same holds true for recommendation services. Recommendation services are becoming increasingly prevalent in connection with other services available via landline and mobile networks. For example, recommendation engines can monitor a user's patterns of use, favorite media types such as music and movie genres, and the like. Based on a user's typical preferences, these recommendation services can provide the user with links or other selectable indicia that is highly probable to be of interest to the user. As in the case of search results, the name attributed to the recommendation link is important, as poor naming can adversely affect the user's decision to select the link—even if the associated content is precisely what the user would be seeking.

The principles of the present invention are equally applicable to such services and applications. For example, in the context of a recommendation service, naming sources may include the text of the link(s) that were used in determining the appropriate recommendation. Genres of the content may also be used alone, or in addition to such text. URLs, portions of the resulting content, and other naming sources analogous to those described in connection with the previously described bookmark/favorite embodiments may also be used. As a more particular example of recommendation naming, consider a movie recommendation service. A user may select a number of movies to rent or purchase, where these selected movies have historically fallen into one or more particular movie genres, such as dramas and comedies. The recommendation engine can then determine that the user generally enjoys dramas and comedies, and may perhaps distinguish further into various species of these genres. The recommendation engine may also recognize that the user has repeatedly selected movies with particular actors and actresses. In accordance with the present invention, several naming sources may be used to provide a descriptive recommendation link name. For example, current recommendation naming techniques may result in a name simply corresponding to the title of the movie: <movie title>. This, however, may be of little use to the user. In accordance with the present invention, naming rules may be applied to one or more relevant naming sources, which can provide a more descriptive recommendation link name that is of use to the user, an example of which is shown in Example 13 below:

<genre> "<movie title>" (<lead actor/actress>)

EXAMPLE 13

As can be seen, such a recommendation link name is substantially more descriptive than simply providing the name of the movie.

Analogous naming principles may be applied to search results and other network services and applications. In the context of search result link naming, naming sources may include all or part of the search text entered by the user, the destination page title, a company and/or entity name of the source of the information, all or part of a URL, portions of the content, etc. Using the various sources of information, naming rules can be applied to derive the appropriate link name. Example 14 illustrates a representative search result link name:

<Nokia> "<WAP Services>" (<The following is a glossary of terms...>)

EXAMPLE 14

Thus, the naming principles described herein are applicable to a variety of links and other selectable indicia of which the examples described herein are merely representative.

Figure 9:
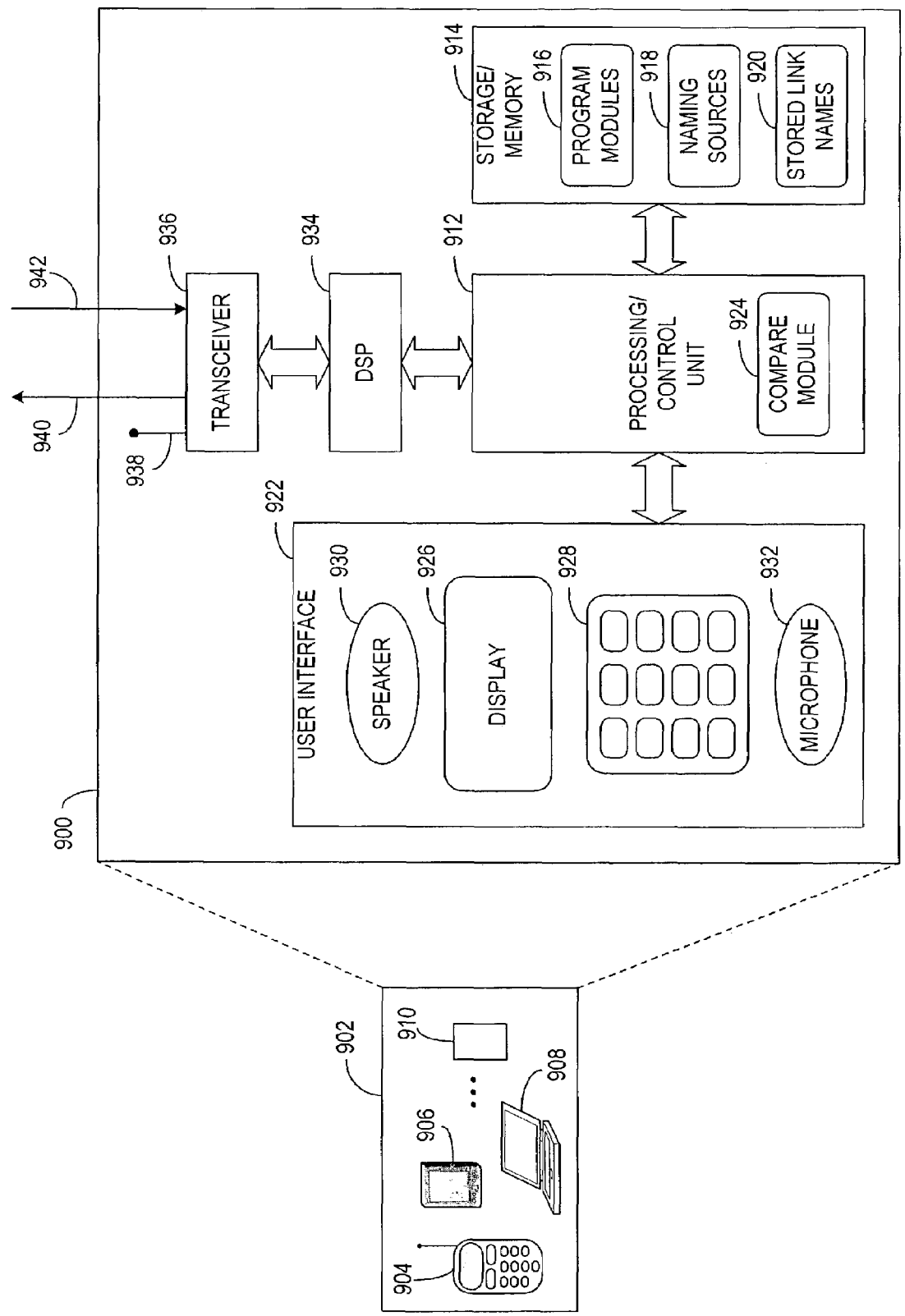
FIG. 9 illustrates an exemplary mobile computing arrangement suitable for performing the link naming functions in accordance with the present invention.

The present invention may be used with various devices, including computing devices such as desktop computers, workstations, laptop computers, or any other computing system capable of accessing information via a network. The present invention is also particularly useful in the context of mobile devices, where network access is accomplished via a wireless network that may or may not ultimately be coupled to a landline network. These mobile devices may be any type of wireless device, such as wireless/cellular telephones, personal digital assistants (PDAs), or other wireless handsets, as well as portable computing devices capable of wireless communication. The mobile devices utilize computing systems to control and manage the conventional device activity as well as the functionality provided by the present invention. Hardware, firmware, software or a combination thereof may be used to perform the various link naming functions, display presentations, and operations described herein. An example of a representative mobile terminal computing system capable of carrying out operations in accordance with the invention is illustrated in FIG. 9.

The exemplary mobile computing arrangement 900 suitable for performing the link naming functions in accordance with the present invention may be associated with a number of different types of wireless devices. For purposes of illustration, the wireless device 902 may represent any of a number of mobile communication devices, such as a cellular telephone 904, a personal digital assistant (PDA) 906, a notebook or laptop computer 908, or any other type of terminal represented by device 910. The representative mobile computing arrangement 900 includes a processing/control unit 912, such as a microprocessor, reduced instruction set computer (RISC), or other central processing module. The processing unit 912 need not be a single device, and may include one or more processors. For example, the processing unit may include a master processor and associated slave processors coupled to communicate with the master processor.

The processing unit 912 controls the basic functions of the mobile terminal as dictated by programs available in the program storage/memory 914. Thus, the processing unit 912 executes the link naming functions associated with the present invention, such as processing the naming rules and generating the resulting link names. More particularly, the program storage/memory 914 may include an operating system and program modules 916 for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The relevant software for carrying out conventional mobile terminal operations and operations in accordance with the present invention may also be transmitted to the mobile computing arrangement 900 via data signals, such as being downloaded electronically via one or more networks, such as the Internet and an intermediate wireless network(s).

The program storage/memory 914 may also store the various naming sources 918 that may be used in the generation of the link names. The program storage/memory 914 also stores lists of the stored link names 920. For example, in the case of bookmarks or favorites, these bookmarks or favorites are stored in the storage/memory 914 to allow a user to access particular sites/pages by selecting the appropriate stored link names 920 via a user interface 922. In one embodiment of the invention, the naming sources 918 and the stored link names 920 are stored in non-volatile electrically-erasable, programmable ROM (EEPROM), flash ROM, etc. so that the information is not lost upon power down of the mobile terminal.

The processor 912, under the direction of one or more program modules 916, performs link naming functions associated with the present invention. For example, in one embodiment of the invention previously described, page titles are compared within a site to determine if the page title is too generic. In another embodiment, page titles are compared across sites to determine if the page title is ambiguous across services. The processor 912 performs such comparisons using a compare module 924, which may be implemented in software or firmware. While such a compare function can alternatively be performed using discrete hardware, the compare function is performed using the processor 912 in the illustrated embodiment.

The processor 912 is also coupled to user-interface 922 elements associated with the mobile terminal. The user-interface 922 of the mobile terminal may include, for example, a display 926 such as a liquid crystal display, a keypad 928, speaker 930, and microphone 932. These and other user-interface components are coupled to the processor 912 as is known in the art. The keypad 928 includes alpha-numeric keys for performing a variety of functions, including dialing numbers and executing operations assigned to one or more keys. For example, in accordance with one embodiment of the present invention, selection of a desired set of naming rules may be selected via the keypad 928. Other user-interface mechanisms may be employed, such as voice commands, switches, touch pad/screen, graphical user interface using a pointing device, trackball, joystick, or any other user interface mechanism. The keypad 928 will be different depending on the type of mobile terminal 902 utilized.

The mobile computing arrangement 900 also includes conventional circuitry for performing wireless transmissions. A digital signal processor (DSP) 934 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 936, generally coupled to an antenna 938, transmits the outgoing radio signals 940 and receives the incoming radio signals 942 associated with the wireless device.

The mobile computing arrangement 900 of FIG. 9 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be accessed via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/ communication links. From the description provided herein, those skilled in the art are readily able to combine software created as described with appropriate general purpose or special purpose computer hardware to create a link naming system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. For example, while the present invention is described in terms of domain names complying with the Domain Name System (DNS), those skilled in the art will appreciate from the description provided herein that the principles of the present invention are equally applicable to other Internet and network addressing/naming schemes. Thus, it is intended that the scope of the invention be limited not with this detailed description, but rather determined from the claims appended hereto.

What is claimed is:

1. A system for generating link names, comprising:
a plurality of link name sources serving as candidates for inclusion in the link name, wherein the plurality of link name sources comprise at least a first set of naming sources and a second set of naming sources;
a rule processor to determine whether a title exists for one or more pages addressable by a link and to determine which of the plurality of link name sources are to be included in the link name in response thereto, wherein the link name sources determined by the rule processor are selected from a) the first set of naming sources if the title exists and b) the second set of naming sources if the title does not exist;
a link name generator to generate the link name in a predetermined format by combining at least two of the link name sources determined by the rule processor; and
a non-volatile data storage of a user device configured to store a representation of the link that is identified by the link name for subsequent identification of the link via the user device.

2. The system of claim 1, wherein the plurality of link name sources comprise any one or more of a destination page title, destination page contents, referring link text, a host name, at least a portion of a search query, entity name of a source of search results, text of links used in arriving at a recommendation, at least one selection genre, and at least one selection species.

3. The system of claim 1, wherein the rule processor and the link name generator comprise a processor operable via software or firmware on a computing system.

4. The system of claim 1, wherein the rule processor and the link name generator comprise a processor operable via software or firmware on a mobile device.

5. The system of claim 1, further comprising a mode selector coupled to the rule processor to designate one of a plurality of sets of naming rules to execute.

6. The system of claim 5, further comprising a user interface coupled to the mode selector to facilitate selection of the designated one of the plurality of sets of naming rules to execute.

7. The system of claim 5, further comprising at least one configuration register coupled to the mode selector to identify the designated one of the plurality of sets of naming rules to execute.

8. A computer-readable medium having instructions stored thereon which are executable by a computing system for naming links to facilitate subsequent identification of the links by performing steps comprising:
designating a plurality of naming sources as candidates for inclusion in a link name for the link, wherein the plurality of naming sources comprise at least a first set of naming sources and a second set of naming sources;
determining whether a title exists for one or more pages addressable by a link to identify two or more of the naming sources for inclusion in the link name, wherein the two or more naming sources are identified from a) the first set of naming sources if the exists, and b) the second set of naming sources if the title does not exist;
generating the link name based on combining at least two of the naming sources identified via the naming rules; and
storing a representation of the link that is identified by the link name in a non-volatile data storage of a user device for subsequent identification of the link via the user device.

9. A processor-implemented method for establishing a link name for a link to at least one destination page, comprising:
determining a state of one or more link characteristics associated with the link, wherein the link characteristic comprises a title of one or more destination pages addressable by the link, and wherein determining the state of the title comprises determining whether the title exists for the one or more pages addressable by the link;
identifying two or more link name sources based on the state of the link characteristics, wherein identifying the two or more link name sources comprises identifying a first set of link name sources based on determining that the title exists and identifying a second set of link name sources based on determining that the title does not exist;
generating the link name for the link by combining information associated with at least two of the identified link name sources; and
storing a representation of the link that is identified by the link name in a user device's non-volatile data storage for subsequent identification of the link via the user device.

10. The method as in claim 9, wherein the link characteristics comprise at least one predetermined link name source, and wherein determining the state of the link characteristics comprises determining the state of the predetermined link name source.

11. The method as in claim 10, wherein the predetermined link name source comprises a page title of one or more pages of a corresponding destination site.

12. The method as in claim 9, wherein the title comprises a page title of the destination page addressable via a network.

13. The method as in claim 9, wherein the title comprises a page title of a web page addressable via the Internet.

14. The method as in claim 9, wherein determining the state of the title comprises determining whether the title is used for a plurality of pages within a site associated with the destination page addressable by the link.

15. The method as in claim 14, wherein:
(a) identifying two or more link name sources comprises:
identifying a third set of link name sources if the title is used for a plurality of pages within the site, and identifying a fourth set of link name sources if the title is not used for a plurality of the pages within the site; and
(b) generating the link name comprises:
generating the link name using the third set of link names if the title is used for a plurality of pages within the site, and generating the link name using the fourth set of link name sources if the title is not used for a plurality of the pages within the site.

16. The method as in claim 9, wherein determining the state of the title comprises determining whether the title occurs at other sites to which links have been named.

17. The method as in claim 16, wherein:
(a) identifying two or more link name sources comprises:
identifying a third set of link name sources if the title occurs at other sites to which links have been named, and identifying a fourth set of link name sources if the title occurs at other sites to which links have been named; and
(b) generating the link name comprises:
generating the link name using the third set of link names if the title occurs at other sites to which links have been named, and generating the link name using the fourth set of link name sources if the title occurs at other sites to which links have been named.

18. The method as in claim 9, further comprising storing the link having the generated link name for subsequent retrieval via selection of the generated link name.

19. A processor-implemented method for naming at least one link to facilitate subsequent identification of the link, comprising:
designating a plurality of naming sources as candidates for inclusion in a link name for the link;
applying naming rules to identify two or more of the naming sources for inclusion in the link name, wherein applying naming rules comprises determining a state of at least one predetermined naming source, and wherein identifying the naming sources for inclusion in the link name is based at least in part on the state of the predetermined naming source, and wherein determining a state of at least one predetermined naming source comprises determining whether a page title of a destination page exists or does not exist, and based on a determination that the page title for the destination page does not exist, identifying the naming sources from a group comprising page contents, referring link text, a page title, and a host name;
generating the link name based on combining at least two of the two or more naming sources identified via the naming rules; and
storing a representation of the link that is identified by the link name in a user device's non-volatile data storage for subsequent identification of the link via the user device.

20. The method as in claim 19, wherein designating a plurality of naming sources comprises designating at least a host name associated with a destination page as one of the plurality of naming sources.

21. The method as in claim 19, wherein designating a plurality of naming sources comprises designating at least a portion of a destination address of a destination page as one of the plurality of naming sources.

22. The method as in claim 21, wherein the destination address comprises at least one of a Uniform Resource Identifier (URI) and a Uniform Resource Locator (URL).

23. The method as in claim 19, wherein designating a plurality of naming sources comprises designating at least a textual portion of a referring link as one of the plurality of naming sources.

24. The method as in claim 19, wherein designating a plurality of naming sources comprises designating at least a portion of content of a destination page as one of the plurality of naming sources.

25. The method as in claim 19, wherein designating a plurality of naming sources comprises designating at least one naming source available via a referring page.

26. The method as in claim 19, wherein designating a plurality of naming sources comprises designating at least one naming source available via one or more destination pages addressed by the link.

27. The method as in claim 19, wherein determining whether a page title of a destination page exists comprises determining that the page title for the destination page exists, and wherein identifying the naming sources for inclusion in the link name comprises determining whether the page title occurs at multiple pages within a destination site.

28. The method as in claim 27, wherein identifying the naming sources for inclusion in the link name comprises identifying at least the page title and text of a referring link for inclusion in the link name, if it is determined that the page title occurs at multiple pages within the destination site.

29. The method as in claim 28, wherein identifying the naming sources for inclusion in the link name comprises identifying at least the page title and page contents of the destination page for inclusion in the link name, if it is determined that the page title occurs at multiple pages within the destination site, and if text of the referring link is not available.

30. The method as in claim 19, wherein determining whether a page title of a destination page exists comprises determining that the page title for the destination page exists, and wherein identifying the naming sources for inclusion in the link name comprises determining whether the page title occurs at other destination sites.

31. The method as in claim 30, wherein identifying the naming sources for inclusion in the link name comprises identifying at least a host name for inclusion in the link name.

32. The method as in claim 31, wherein identifying at least the host name comprises identifying the host name in addition to at least one other naming source for inclusion in the link name.

33. The method as in claim 19, wherein determining whether a page title of a destination page exists comprises determining that the page title for the destination page exists, and wherein identifying the naming sources for inclusion in the link name comprises identifying the page title, text of a referring link, and a host name for inclusion in the link name.

34. The method as in claim 19, wherein generating the link name comprises visually differentiating between each of the naming sources identified via the naming rules.

35. The method as in claim 19, wherein the link comprises at least one of a bookmark link, a favorite link, a recommendation link, and a search result link.

36. The method as in claim 19, further comprising accessing at least one destination page by selecting the generated link.

37. The method as in claim 19, wherein the link name corresponds to a recommendation link, and wherein designating a plurality of naming sources comprises designating a plurality of naming sources selected from a group comprising text of the links that were used in arriving at a recommendation, selection genres, selection species, information source URLs, and all or part of resulting content.

38. The method as in claim 19, wherein the link name corresponds to a search result link, and wherein designating a plurality of naming sources comprises designating a plurality of naming sources selected from a group comprising all or part of text of an input query, destination page title, entity name of a source of search results, and all or part of resulting content.

39. The method as in claim 19, further comprising:

storing one or more of the naming sources with the generated link name;

facilitating renaming of the generated link name using one or more of the stored naming sources.

40. The method as in claim 39, wherein facilitating renaming of the generated link comprises facilitating user entry of custom information forming at least a portion of a resulting renamed link.

* * * * *